United States Patent
Abel et al.

(10) Patent No.: US 10,338,630 B2
(45) Date of Patent: Jul. 2, 2019

(54) OPTICAL COMPUTING SYSTEM

(71) Applicant: International Business Machines Corporation, Armonk, NY (US)

(72) Inventors: Stefan Abel, Zurich (CH); Jean Fompeyrine, Wadenswil (CH); Bert Jan Offrein, Shoenenberg (CH); Walter Heinrich Riess, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/477,221

(22) Filed: Apr. 3, 2017

(65) Prior Publication Data

US 2018/0284834 A1    Oct. 4, 2018

(51) Int. Cl.
| | |
|---|---|
| *G06E 3/00* | (2006.01) |
| *G06E 1/02* | (2006.01) |
| *G02B 6/42* | (2006.01) |
| *G02F 1/35* | (2006.01) |
| *G02B 6/122* | (2006.01) |
| *G06N 3/06* | (2006.01) |
| *G02B 6/12* | (2006.01) |

(52) U.S. Cl.
CPC .............. *G06E 1/02* (2013.01); *G02B 6/1225* (2013.01); *G02B 6/4298* (2013.01); *G02F 1/35* (2013.01); *G06N 3/06* (2013.01); *G02B 2006/12138* (2013.01)

(58) Field of Classification Search
CPC ......... G02B 6/125; G06E 3/001; G06E 3/006; G06E 1/02; G06N 3/02; G06N 3/04; G06N 3/0675

USPC .................................... 359/107, 108; 706/27
See application file for complete search history.

(56) References Cited

U.S. PATENT DOCUMENTS

| | | | | |
|---|---|---|---|---|
| 5,093,802 A | * | 3/1992 | Hait ........................ | G06E 3/001 359/1 |
| 7,554,707 B1 | * | 6/2009 | Golshan ................. | G02B 6/125 359/107 |
| 9,477,136 B2 | | 10/2016 | Bienstman et al. | |

OTHER PUBLICATIONS

Vandoorne, Kristof, et al., "Experimental demonstration of reservoir computing on a silicon photonics chip", Nature Communications, Mar. 2014, 6 pgs.

(Continued)

*Primary Examiner* — Audrey Y Chang
(74) *Attorney, Agent, or Firm* — Harrington & Smith

(57) ABSTRACT

System and method related to photonic computing are provided. A photonic computing system may include an optical interference region and an input waveguide configured to couple an optical input signal to the optical interference region and to create an optical interference pattern in the optical interference region. The interference pattern has an optical power distribution. The photonic computing system may further include a readout unit that is arranged in an inner area of the optical interference region. The readout unit is configured to detect an optical readout signal of the optical power distribution at a readout position of the inner area of the optical interference region. A method is also provided for performing photonic computing.

20 Claims, 7 Drawing Sheets

(56) References Cited

OTHER PUBLICATIONS

Katumba, Andrew, et al., "Photonic reservoir computing approaches to nanoscale computation", Proceedings of the Second Annual International Conference on Nanoscale Computing and Communication, NANOCOM'15, ACM Digital Library, 2015, 2 pgs.

Vandoorne, Kristof, et al., "Toward optical signal processing using Photonic Reservoir Computing", Optics Express, vol. 16, Issue 15, Jul. 21, 2008, 11 pgs.

* cited by examiner

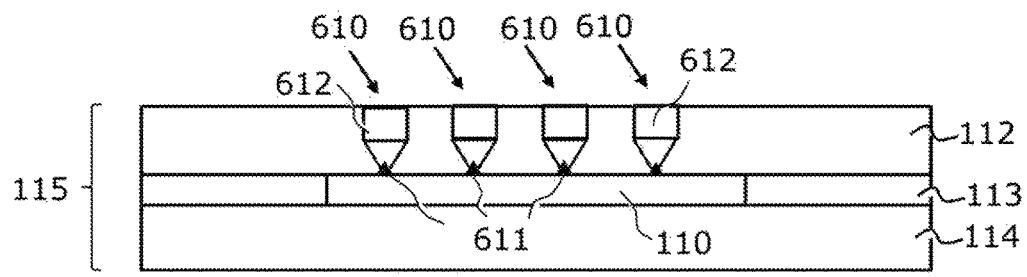
FIG. 6    600
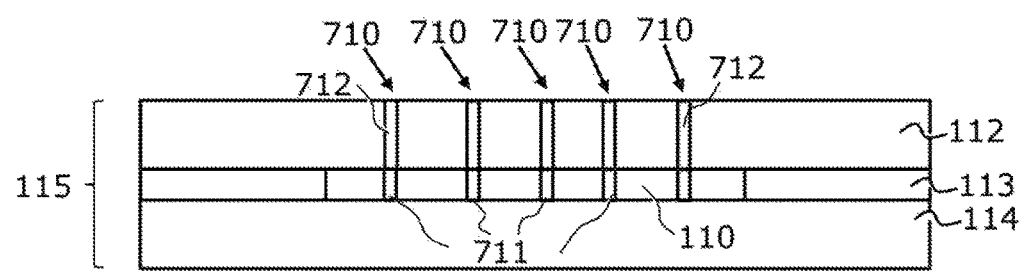
FIG. 7    700
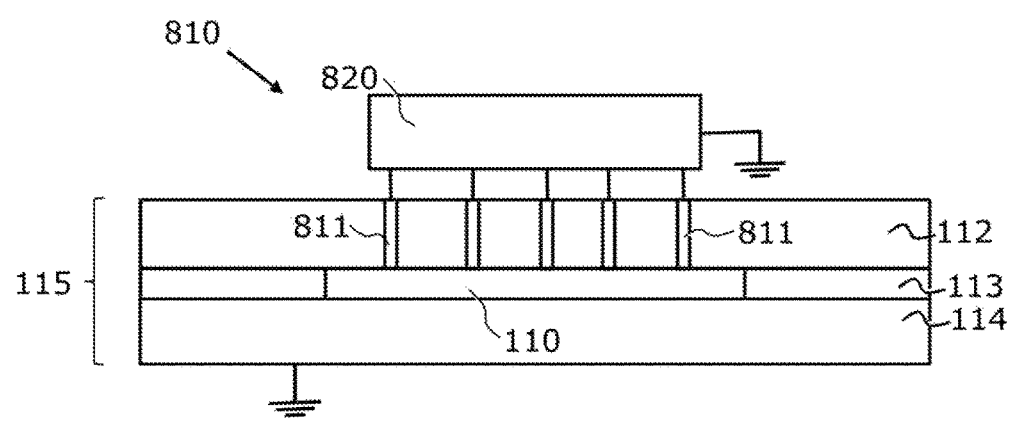
FIG. 8    800

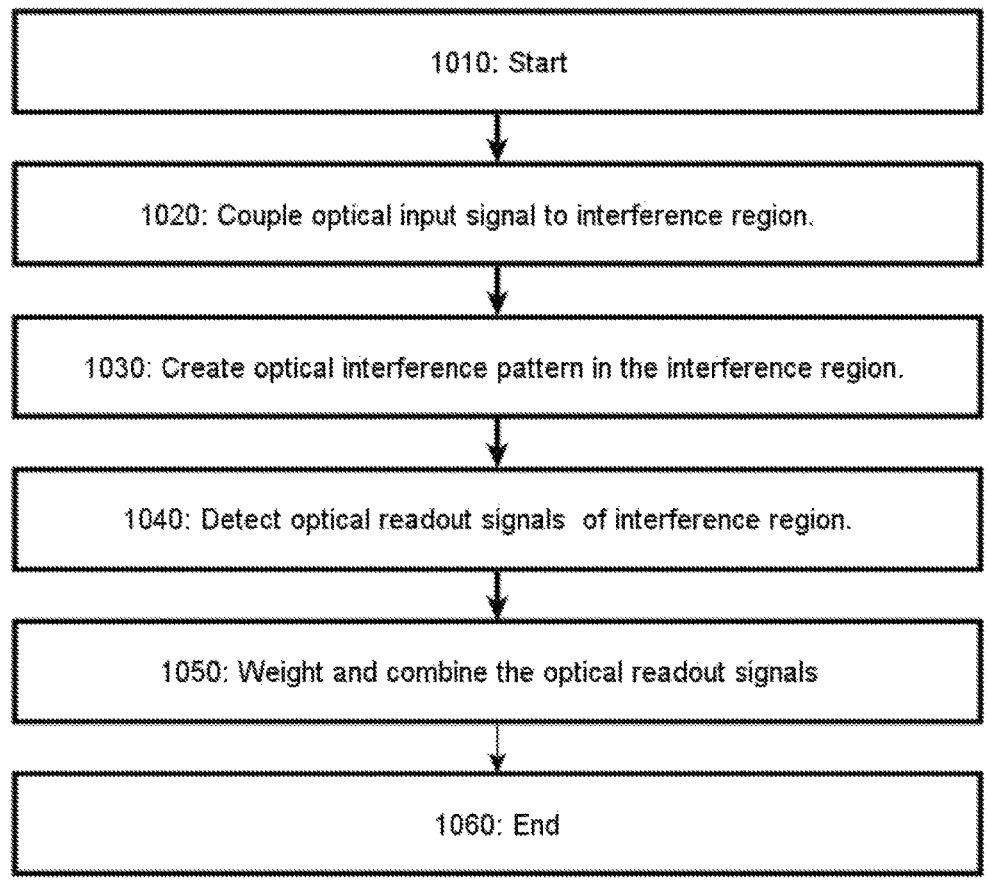
FIG. 10     1000

OPTICAL COMPUTING SYSTEM

BACKGROUND

The present invention relates generally to a photonic computing system.

The invention also relates to a corresponding method for performing photonic computing.

Neuromorphic networks are widely used in pattern recognition and classification, with many potential applications from fingerprint, iris, and face recognition to target acquisition, etc. The parameters (e.g., 'synaptic weights') of the neuromorphic networks are adaptively trained on a set of patterns during a learning process, following which the neuromorphic network is able to recognize or classify patterns of the same kind.

A key component of a neuromorphic network is the 'synapse,' at which weight information is stored, typically as a continuous-valued variable. For applications that would benefit from compact, high-performance, low-power, portable neuromorphic network computation, it is desirable to be able to construct high-density hardware neuromorphic networks having a large number of synapses ($10^9$-$10^{10}$ or more). Currently a neuromorphic network is typically realized as a software algorithm implemented on a general-purpose computer, although hardware for accelerating the algorithms as well as neuromorphic networks exist.

Neural networks may be used for various types of learning. As an example, in "supervised learning" a set of (input, desired output) pairs is provided to the neuromorphic network, one at a time, and a learning algorithm finds values of the "weights" (the adjustable parameters of the neuromorphic network) that minimize a measure of the difference between the actual and the desired outputs over the training set. If the neural network has been well trained, it will then process a novel (previously unseen) input to yield an output that is similar to the desired output for that novel input. That is, the neural network will have learned certain patterns that relate input to desired output, and generalized this learning to novel inputs.

As another example, in "unsupervised learning," a set of inputs (without "desired outputs") is provided to the neural network, along with a criterion that the neural network is to optimize. An example of such a criterion is that the neural network is able to compress an input into a smaller amount of information (a "code") in such a way that the code can be used to reconstruct the input with minimum average error.

As yet another example, in "reinforcement learning," a "reward/penalty" value is provided (by an external "teacher"). The "reward/penalty" value depends upon the input and the network's output. This value is used to adjust the weights (and therefore the network's outputs) so as to increase the average "reward."

Neural network applications may include pattern recognition, classification, and identification of fingerprints, faces, voiceprints, similar portions of text, similar strings of genetic code, prediction of the behavior of systems etc.

Reservoir computing systems allow the analysis of dynamical input data by training the output for certain tasks, e.g. for classification or forecast purposes.

One challenge is the implement such systems into hardware with small dimensions, in particular dimensions that are suitable for CMOS technology integration.

Accordingly, there is a need for further optical computing systems.

SUMMARY

This section is intended to include examples and is not intended to be limiting.

According to a first example embodiment, a photonic computing system is provided including: an optical interference region; an input waveguide configured to couple an optical input signal to the optical interference region and to create an optical interference pattern in the optical interference region, the interference pattern having an optical power distribution; and a readout unit being arranged in an inner area of the optical interference region and being configured to detect an optical readout signal of the optical power distribution at a readout position of the inner area of the optical interference region.

According to another example embodiment, a method is provided for performing photonic computing, the method including: coupling an optical input signal to an optical interference region; creating, by the optical input signal, an optical interference pattern in the optical interference region, the interference pattern having an optical power distribution; and detecting optical readout signals of the optical power distribution at readout positions of an inner area of the optical interference region.

Embodiments of the invention will be described in more detail below, by way of illustrative and non-limiting examples, with reference to the accompanying drawings.

Embodiments and advantages of one aspect of the invention may be applied to other aspects of the invention as appropriate.

BRIEF DESCRIPTION OF THE DRAWINGS

FIG. 6 shows a side view of a photonic computing system illustrating an embodiment for detecting an optical readout signal;

FIG. 7 shows a side view of a photonic computing system illustrating another embodiment for detecting the optical readout signal;

FIG. 8 shows a side view of a photonic computing system illustrating yet another embodiment for detecting the optical readout signal;

FIG. 10 shows a flow chart of steps of a method for performing photonic computing according to an embodiment of the invention.

DETAILED DESCRIPTION

Definitions:

A photonic computing system according to embodiments of the invention may be implemented as hardware implementation of a neural network, in particular as reservoir computing system.

Neural networks are widely used in pattern recognition and classification, with many potential applications from fingerprint, iris, and face recognition to target acquisition, etc. The parameters (e.g., 'synaptic weights') of the neural networks can be adaptively trained on a set of patterns during a learning process, following which the neural network is able to recognize or classify patterns of the same kind.

A key component of a neural network is the 'synapse,' at which weight information is stored, typically as a continuous-valued variable.

Neural networks may be used for several types of learning. For the photonic computing system according to embodiments of the invention, a "supervised learning approach" may be favorably used. With such a supervised learning approach a set of (input, desired output) pairs is provided to the neural network, one at a time, and a learning algorithm finds values of the "weights" (the adjustable parameters of the neural network) that minimize a measure of the difference between the actual and the desired outputs over the training set. If the neural network has been well trained, it will then process a novel (previously unseen) input to yield an output that is similar to the desired output for that novel input. That is, the neural network will have learned certain patterns that relate input to a desired output. Furthermore, it may generalize this learning to novel inputs. The network might be trained for pattern classification, data forecast, or similar tasks.

Figure 1A:
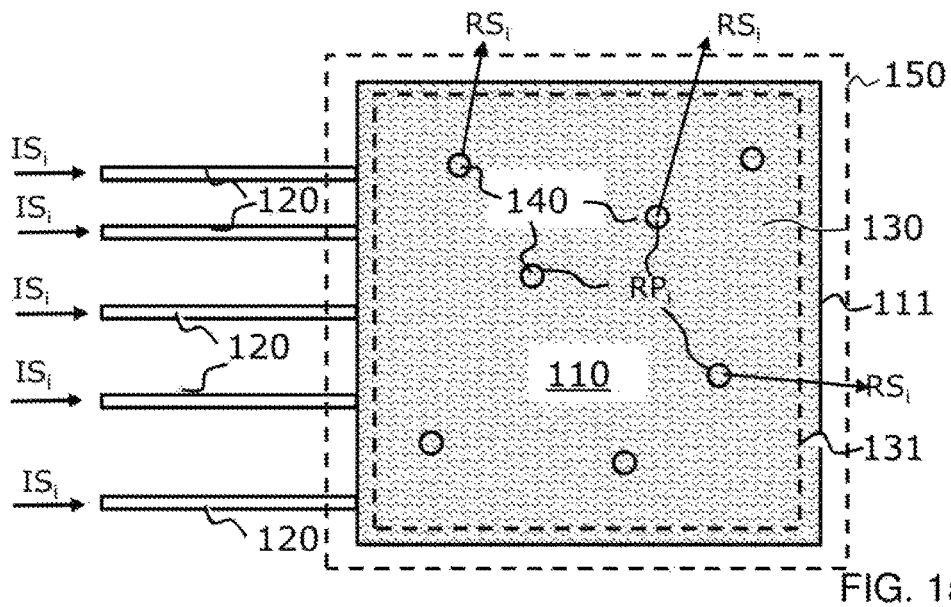
FIG. 1*a* shows a schematic illustration of a top view of photonic computing system according to an embodiment of the invention.
Figure 1B:
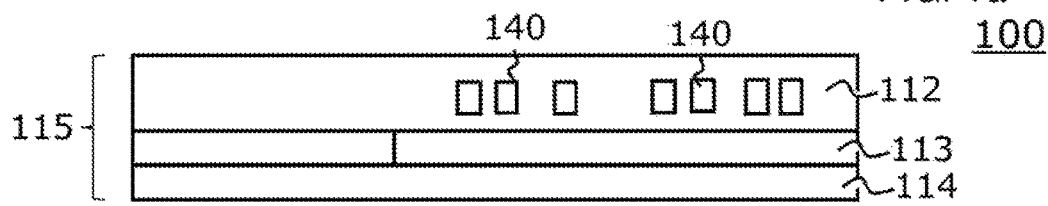
FIG. 1*b* shows a corresponding side view.

FIG. 1a and FIG. 1b show a schematic illustration of a photonic computing system 100 according to an embodiment of the invention. FIG. 1a shows a top view and FIG. 1b a corresponding side view. The photonic computing system 100 comprises an optical interference region 110 and a plurality of input waveguides 120. The plurality of input waveguides 120 receive a plurality of optical input signals $IS_i$ that shall be processed by the photonic computing system 100. The input waveguides 120 couple the optical input signals $IS_i$ to the optical interference region 110. The optical interference region 110 is embodied as confined interference region with edges 111 that confine the optical interference region 110. According to another embodiment, the optical interference region may be edge-less. According to the embodiment as illustrated in FIGS. 1a and 1b, the optical interference region 110 is implemented as a planar waveguide structure 115 having an upper layer 112, a middle layer 113 and a lower layer 114. The upper layer 112 and the lower layer 114 may be embodied e.g. as $SiO_2$ layer. The middle layer 113, which may also be denoted as central layer 113, may be embodied e.g. as Si-layer. The middle layer establishes the core of the waveguide structure 115, while the upper layer 112 and the lower layer 114 establish cladding layers of the waveguide structure 115. In operation, the middle layer 113 guides one or more modes of the optical input signals $IS_i$. The middle layer 113 may consist of a single material, or various mixtures of materials (e.g. a stack of III/V layers).

The input signals $IS_i$ that have been coupled via the waveguides 120 to the interference region 110 create an optical interference pattern 130 in the optical interference region 110. The optical interference pattern 130 has an optical power distribution representing the respective optical power at the respective location of the optical interference pattern 130. The optical interference pattern 130 is schematically illustrated in FIG. 1a with a waveform pattern.

The computing system 100 comprises a plurality of readout units 140. The plurality of readout units 140 are arranged in an inner area 131 of the optical interference region 110 as opposed to edges 111 of the optical interference region 110. According to embodiments, the inner area 131 may be defined as the whole area of the optical interference region 110 without the edges 111.

According to embodiments, the edges 111 could be formed by a mirror structure, e.g. a bragg reflector, or a metal coating on the interference region 110. According to other embodiments, the edges 111 may correspond to a transition between the interference region 110 and a surrounding area 150 as indicated by a dotted line. According to a simple embodiment, the surrounding area 150 could be formed by a layer that has a different refractive index than the interference region 110, e.g. a layer of $SiO_2$ for an interference region 110 of Si.

The readout units 140 are configured to detect a plurality of optical readout signals $RS_i$ of the optical power distribution at readout positions $RP_i$ of the inner area 131 of the optical interference region 110. According to embodiments, the readout unit 140 is configured to detect an optical intensity, an optical power, an optical energy and/or an optical phase information as optical readout signal.

According to embodiments, the photonic computing system 100 may be configured as a reservoir computing system.

Figure 2:
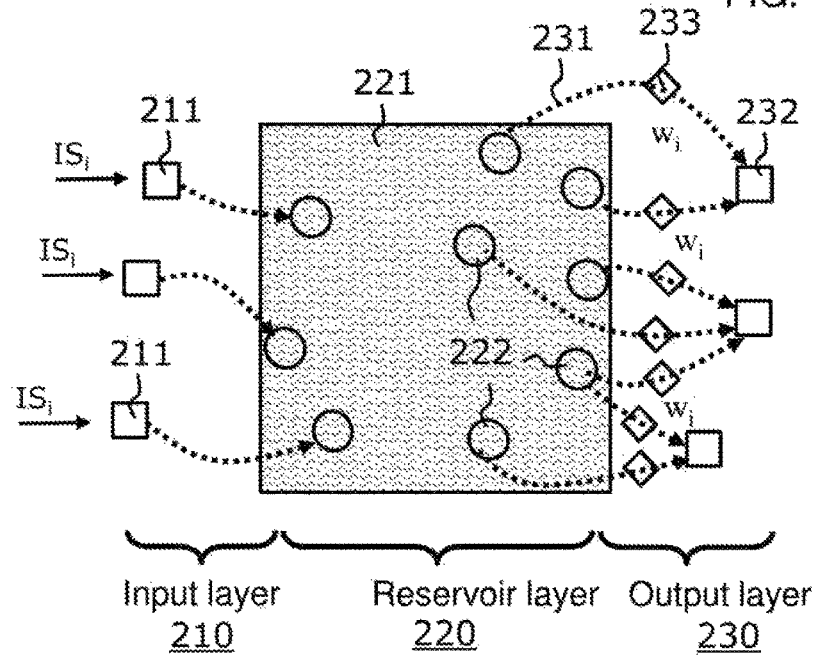
FIG. 2 shows a schematic principal illustration of a photonic computing system embodied as optical reservoir computing system according to an embodiment of the invention.

FIG. 2 shows a schematic principal illustration of a photonic computing system 200 embodied as optical reservoir computing system according to an embodiment of the invention. The photonic computing system 200 comprises an input layer 210, a reservoir layer 220 and an output layer 230. The input layer 210 comprises a plurality of input nodes 211 which are configured to receive optical input signals $IS_i$ and to provide the optical input signals $IS_i$ to the reservoir layer 220. The optical input signals $IS_i$ may be embodied in particular as optical input streams.

The reservoir layer 220 comprises a confined reservoir region which is embodied as confined, but continuous optical reservoir region 221 with a plurality of optical reservoir nodes 222. More particularly, the reservoir layer 220 is formed as optical interference pattern having an optical power distribution.

The photonic computing system 200 comprises further a plurality of optical output connections 231 between one or more of the optical reservoir nodes 222 and optical output nodes 232. One or more of the optical output connections 231 comprise optical weighting elements 233, which can be adjusted during a training process. More particularly, the optical reservoir system 200 can be trained to perform a specific computation task.

Comparing the illustration of FIG. 1 with the illustration of FIG. 2, the input nodes 211 may be considered to correspond to the optical input waveguides 120, in particular to the coupling areas at the intersection between the optical input waveguides 120 and the optical interference region 110. Furthermore, the reservoir layer 220 corresponds to the interference region 110 and the reservoir nodes 222 correspond to the readout units 140 or to the readout positions $RP_i$ respectively.

The training process of the optical reservoir computing system 200 will only change the weights $w_i$ of the output layer 230 formed by the optical output nodes 232 and the output connections 231 comprising the optical weighting elements 233. However, the reservoir layer 220 itself will remain fixed with fixed weights and will not change during the training/learning process. The weighting elements 233 are also denoted as synaptic weights.

The output nodes 232 deliver an optical output signal, which can be converted into the electrical domain by suitable converters as known to the skilled person in the art. The converted output signals may then be further processed in the electrical domain by suitable hardware or software processing means. The adjustment of the weights of the optical weighting elements 233 may be also done in software or hardware. More particularly, according to embodiments, a hardware control circuit with additional control software running on it may receive the output signals of the output nodes 232 during the training process and may adjust the weights of the optical weighting elements 233 by applying electrical control signals to the optical weighting elements 233. The optical weighting elements 233 may be e.g. embodied as optical attenuators or optical amplifiers. During the training process, certain states of the reservoir system may be assessed. In particular, with some learning algorithms, the state of the output connections 232 after the weighting elements 232 might be needed. Therefore, parts of the optical signal might be split to a dedicated detector and fed to the respective learning algorithm during the training process.

The optical reservoir computing system 200 may be operated according to the reservoir computing paradigm.

While according to this embodiment the conversion from the optical domain to the electrical domain is performed at the optical output nodes 232, this conversion may be done earlier according to other embodiments. More particularly, according to some embodiments, the conversion to the electrical domain may be already performed at the reservoir nodes 222. According to such an embodiment, the output connections 231 may be embodied as electrical output connections, the weighting elements 233 may be embodied as electrical weighting elements and the output nodes 232 are embodied as electrical output nodes. However, it should be noted that also according to such an embodiment the optical reservoir 220 itself and the reservoir nodes 222 are still in the optical domain only. According to a further embodiment, the weighting elements 233 and the output nodes 232 may be embodied in software.

As a result, the output connections 232 are trained output connections forming a trained or controlled layer with respect to weighting such that the reservoir computing system 200 can compute desired results, even with unknown inputs. For example, the reservoir computing system 200 may be configured with an output layer that is controlled for weighting that when a known input is supplied at the input nodes/input layer, a known output is generated at the output nodes/output layer. And, when an unknown input is supplied to the reservoir computing system 200, the output at the output nodes 232 may be robust, reliable, and accurate.

As described herein, weights or weighting may be an altering or modification of a transmission through the output connections 231. That is, the transmission of a pulse through the output connections 231 may be controlled to have a greater or lesser amplitude after passing the weighting elements 233 based on the training of the network, thus having certain connections be stronger while others are weaker. For example, a waveguide can be used where the transmission is tuned during training. In such an example, the output information may be encoded in the amplitude of an optical signal in the waveguide. The optical signal can be superimposed with the signal of other waveguides, and such a system can encode information about a class in different amplitudes.

According to embodiments the optical reservoir system may 200 comprise a plurality of output layers that may be formed by different sets of the output nodes 232. Each of the plurality of output layers may be trained on performing a classification according to different classification criteria. The output nodes 232 can also be used as an input for a successive neural network (in software or hardware) for further processing the output of the reservoir system.

According to embodiments, the optical reservoir computing system 200 employs reservoir computing by a reconfigurable reservoir or network. Further, by adjusting the weights of the various connections in the network, the network may be tuned to operate at different stable operation points, and thus may be re-configurable to each of the stable operation points. As described herein, according to embodiments the nodes or neurons of the reservoir system may enable hardware tuning of output, input, and reservoir weight. Furthermore, according to embodiments weighting and training of the neuromorphic network may be performed at the hardware level. The training may use a software algorithm to perform the training, such as providing information about how to adjust the hardware weights. The resulting trained state of the network is encoded non-volatilely in the hardware (i.e., in the nodes and the connections between them), rather than being a software weight that is applied during the computing process.

In some embodiments, this may be achieved by constructing the reservoir system from materials whose optical properties can be modified permanently, but changeably, such that a change in one of the nodes and/or layers may be long term and achieved through stimuli, resulting in a neuromorphic network that is trained at any level and internally, not relying on any external software and/or algorithms. The stimuli may be optical, electrical, thermal, mechanical, magnetic, etc., and may depend on the material of the nodes and/or connections that are used to form the network.

Figure 3:
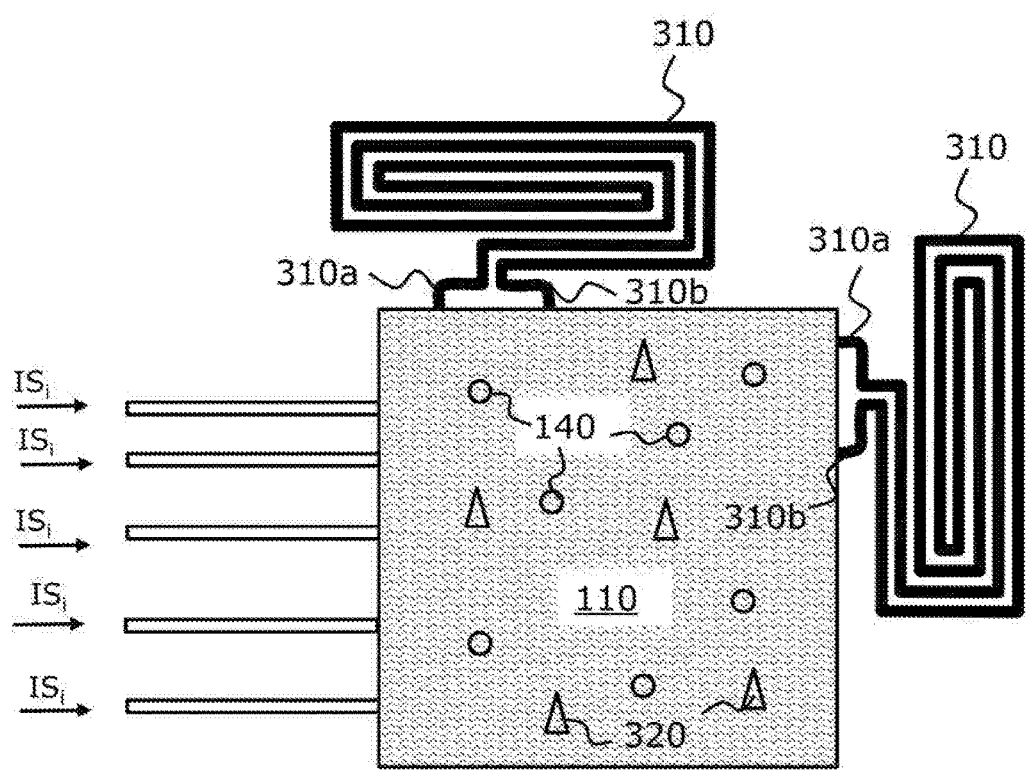
FIG. 3 show a schematic illustration of top view of a photonic computing system according to another embodiment of the invention.

FIG. 3 shows a schematic illustration of a top view of a photonic computing system 300 according to another embodiment of the invention. The computing system 300 comprises two feedback delay waveguides 310, which map temporal information of the optical input signal $IS_i$ into the optical interference pattern 110. More particularly, at an input 310a of the feedback delay waveguides 310, an optical signal of the optical interference pattern is coupled into the feedback delay waveguides 310 as optical feedback signal. Then this optical feedback signal is delayed via the feedback delay waveguides 310 and fed back at an output 310b with a time delay to the interference region 110. Correspondingly, the delay waveguides 310 operate in the reversed direction for optical signals that are coupled into the output 310b and are fed back at the input 310a.

According to the embodiment as illustrated in FIG. 3a, the interference region 110 comprises a plurality of scattering centers 320 within the inner area of the interference region 110. These scattering centers 320 enhance the dynamic behavior of the interference region 110. The scattering centers 320 are illustrated with triangles and might be implemented e.g. as optical surface irregularities of the interference region 110, e.g. as pillars or arbitrary shapes of a material with a different refractive index than the interference region 110. As a result, the information density in the optical interference pattern is increased. In other words, the interference pattern becomes "richer" in terms of number of parameters that would be needed to fully describe the power distribution. Furthermore, small variations of the input signal (phase) would change the interference pattern more drastically if scattering centers 320 are embedded According to embodiments, the refractive index and/or absorption of the scattering centers can be tuned/adjusted in order to change the interference behavior of the optical waves in the interference region 110. This tuning might be used to adjust the dynamics/response of the reservoirs system for different computing tasks.

The tuning may be based on locally addressing the refractive index/absorption in the scattering centers or more generally in the material of the interference region based on e.g. locally applying an electric field and using the electro-optical effect (Pockels, Kerr effect), the plasma dispersion effect, phase transitions in phase-change materials. Alternatively, the temperature might be (locally or globally) changed to change the refractive index. Similar effects to change the refractive index (e.g. photorefractive effect) might also be used.

Figure 4:
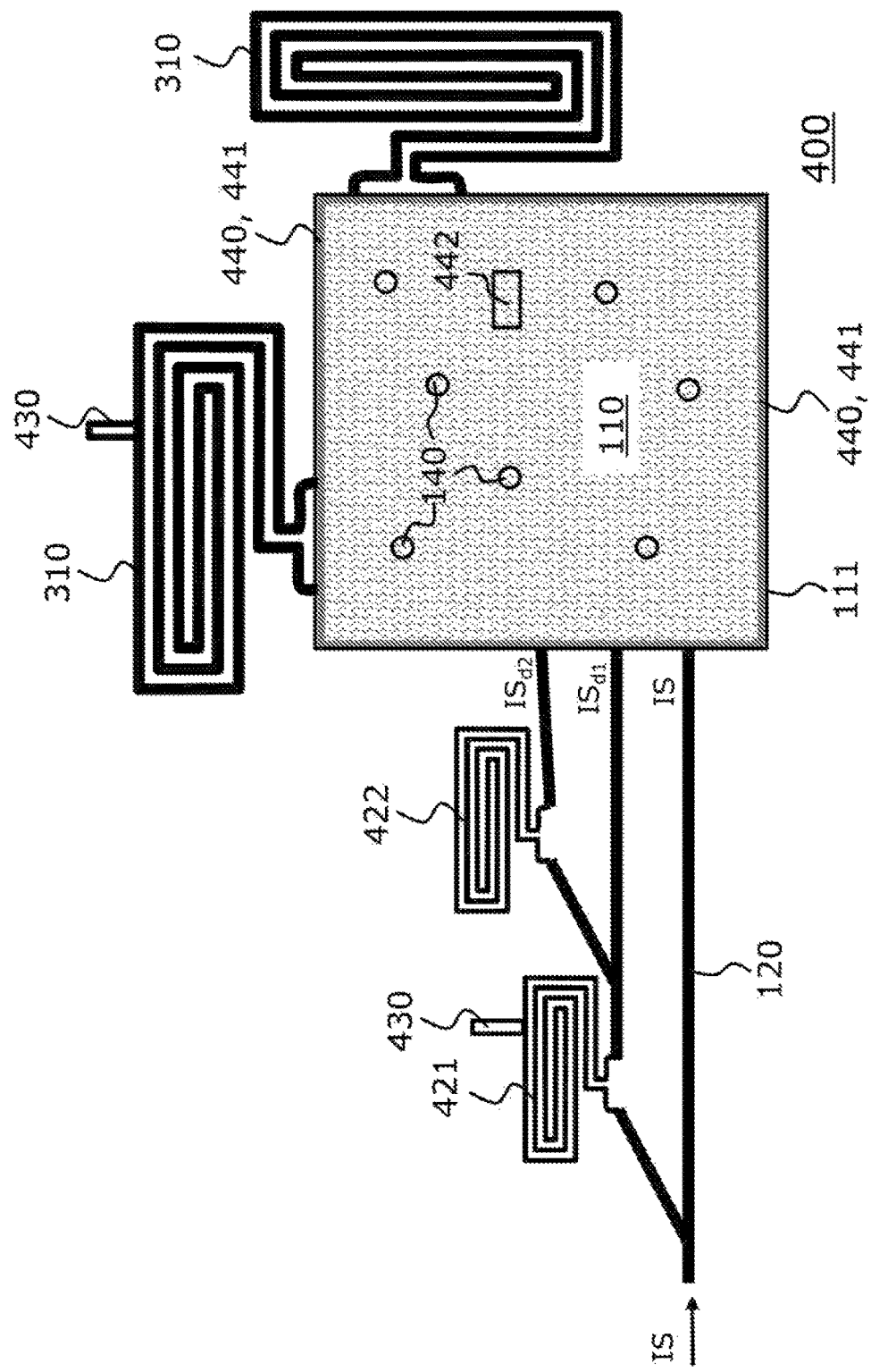
FIG. 4 shows a schematic illustration of a top view of a photonic computing system according to another embodiment of the invention.

FIG. 4 shows a schematic illustration of a top view of a photonic computing system 400 according to another embodiment of the invention.

The computing system 400 comprises two feedback delay waveguides 310, which map temporal information of the optical input signal into the optical interference pattern as explained above with reference to FIG. 3.

In addition, the photonic computing system 400 comprises two input delay waveguides 421 and 422. The input delay waveguide 421 is configured to receive a part of an input signal IS, e.g. through a splitter or a coupler. The input signal IS is then delayed by the input delay waveguide 421 and forwarded as delayed input signal $IS_{d1}$ with a first time delay d1 to the interference region 110. The delayed input signal $IS_{d1}$ is furthermore forwarded to the input delay waveguide 422, e.g. via a splitter or coupler. The delayed input signal $IS_{d1}$ is then further delayed by the input delay waveguide 422 and forwarded as further delayed input signal $IS_{d2}$ with a second time delay d2 to the interference region 110.

According to other embodiments, a plurality of further combinations of feedback delay lines and input delay lines may be provided to achieve a temporal mapping as desired.

According to embodiments, the optical computing systems 100, 200, 300 and/or 400 comprises one or more nonlinear components for performing a nonlinear signal transformation. The nonlinear components may be in the interference region 110, the input waveguides 120, the input delay waveguides 421, 422 and/or the feedback delay waveguides 310.

Referring to FIG. 2, the nonlinear components may be implemented according to embodiments by the optical reservoir nodes 222, or a subset of the optical reservoir nodes 222. According to another embodiment, optical cavities 430 may be arranged in the feedback delay waveguides 310 or the input delay waveguides 421, 422 as schematically indicated in FIG. 4. The transmission through cavities 430 dependent on the input power to that cavity.

As an example, a silicon ring resonator whose resonances are impacted by the amount of photons/energy in the cavity may be used. More particularly, due to processes such as 2-photon absorption, the refractive index changes, which in return changes the position and shape of the resonance. As a result, the transmission through such structures are power dependent and hence nonlinear.

The non-linear components are in particular provided for photonic computing systems that are configured to process amplitude-modulated optical input signals, while photonic computing systems that process phase-modulated optical input signals already comprise a nonlinearity due to the nonlinear dependence of the optical power distribution of the optical interference pattern on the phase delay of the optical input signal.

According to another embodiment electro-optical materials may be used. Such a material could be e.g. arranged as a coating in the interference region 110 at the inner side of the edges 111 as indicated in FIG. 4 with a grey shading and reference numeral 440. According to other embodiments, such a material could be arranged in the delay waveguides 120, 310, 421, 422, or in the interference region 110. Such materials induce a phase shift on the optical signal, e.g. by linearly modifying the refractive index by the optical power of the optical interference pattern. This in turn results in a linear phase shift, which effects a nonlinear modification of the interference pattern. Examples for such materials are $BaTiO_3$, $KNbO_3$, $LiNbO_3$, $LiIO_3$, AlN, Si, etc. Similarly, besides the linear electro-optical Pockels effect, other effects such as the electro-optical Kerr effect or the plasma dispersion effect could be used to nonlinearly change the optical power distribution in the interference region.

According to another embodiment, thermo-optical elements, in particular thermo-optical materials, may be used. Such a material could also be arranged in the interference region 110 at the inner side of the edges 111 as indicated in FIG. 4 with reference numeral 441. According to other embodiments, such a material could be arranged in the delay waveguides 120, 310, 421, 422, or in the interference region 110. According to such an embodiment the interference pattern creates temperature variations resulting in a linear change of the refractive index which in turns results in a nonlinear change of the interference pattern. According to further embodiments, further nonlinear components 442 may be provided, e.g. in the interference region 110, e.g. a photorefractive element, an optical amplifier or an attenuator.

According to a further embodiment, photorefractive materials may be used for nonlinear variations. In a photorefractive material, the refractive index is a function of the optical power, which changes the refractive index of that material. This change can be volatile with rather short time constants (ns or below in IIIN materials such as GaAs, depending on doping and other factors). Such photorefractive materials material could be inserted in the delay lines, the interference region and/or the input waveguides to create a change of the refractive index which in turn causes a change of phase and/or amplitude.

According to a further embodiment, phase change materials may be used for nonlinear variations. Such materials change their phase dependent on the optical input power (e.g. $VO_2$) and relax very quickly back to the initial state. Both phases have different optical properties and are hence dependent on optical input power. Accordingly, the transmitted light will be phase shifted and/or the amplitude will be changed.

According to a further embodiment, semiconductors can be used as amplifiers (semiconductor optical amplifiers, SOAs) or absorbers. The transmission of such elements is nonlinear in respect to the optical input power, which results in a nonlinear change of amplitude, and potentially a phase shift. Suitable semiconductor materials are III/V materials such as GaAs or InGaAs.

In addition, or alternatively to the feedback delay waveguides 310 or the input delay waveguides 421 and 422, photonic computing systems according to embodiments may use further means to map the temporal information of the optical input signal(s) $IS_i$ into the optical interference pattern. Such embodied photonic computing systems may comprise thermo-optical elements, in particular thermo-optical materials, to map the temporal information of the optical input signal(s) $IS_i$ into the optical interference pattern. The thermo-optical elements may employ thermal effects to provide the mapping. More particularly, a thermo-optical element may be an element that shows an optical response to a thermal change. The thermo-optical elements may be implemented as a region of the optical interference region 110 that has a special coating which absorbs optical power. As a result of the absorption, the coating is heated. This in turn changes the optical properties of the coating. Thereby the interference pattern is changed. Such an effect has usually a rather slow decay.

According to other embodiments, the photonic computing system may comprise electro-optical elements for the temporal mapping. The electro-optical elements may be configured to use electro-optical effects. Electro-optical elements provide a change in the optical properties of the electro-optical elements in response to an electrical signal, in particular an electric field. A change in the optical properties may be e.g. a change of the absorption or a change of the refractive index. According to embodiments, electric field effects, in particular plasma dispersion effects, may be used.

Accordingly, the electro-optical element may be implemented as a region of the optical interference region that has a special coating, which also absorbs optical power. The absorption of the optical power changes the carrier concentration of the electro-optical element. This in turn changes the optical properties of the coating. Thereby the interference pattern is changed. Such an effect has usually a rather medium decay.

According to a further embodiment, phase-change materials that change their structure (e.g. crystalline structure) dependent on the optical input power or temperature may be used. If the two (or more) phases have different optical properties, such materials can be used for temporal optical memory.

VO2 is an example that switches between dielectric and a metallic state. The decay has medium speed. Other possible materials are e.g. TiN or GeSbTe [GST].

According to a further embodiment, photorefractive materials may be sued which change their optical properties depending on the optical input power. Depending on the material system, the relaxation time can be very short (ns) or very long (several s).

Examples for photorefractive materials are e.g. $BaTiO_3$, $LiNbO_3$, $Pb[Zr_xTi_{1-x}]$ or GaAs.

According to another embodiment SOAs and attenuators may be used. The dynamical properties of SOAs and saturable attenuators can be rather slow compared to the frequency of the optical input signal. Hence such elements could be used as fading memory.

According to another embodiment the photonic computing system may comprises an electrical feedback loop. Such an electrical feedback loop may encompasses a detector, an electrical storage means, e.g. capacitor, and an electro-optical switch for changing optical properties of the photonic computing system.

According to another embodiment, the photonic computing system may comprise optical cavities, e.g. the cavities 430 indicated in FIG. 4. For the temporal mapping, the cavities 440 may be configured to have a finite optical lifetime.

Figure 5:
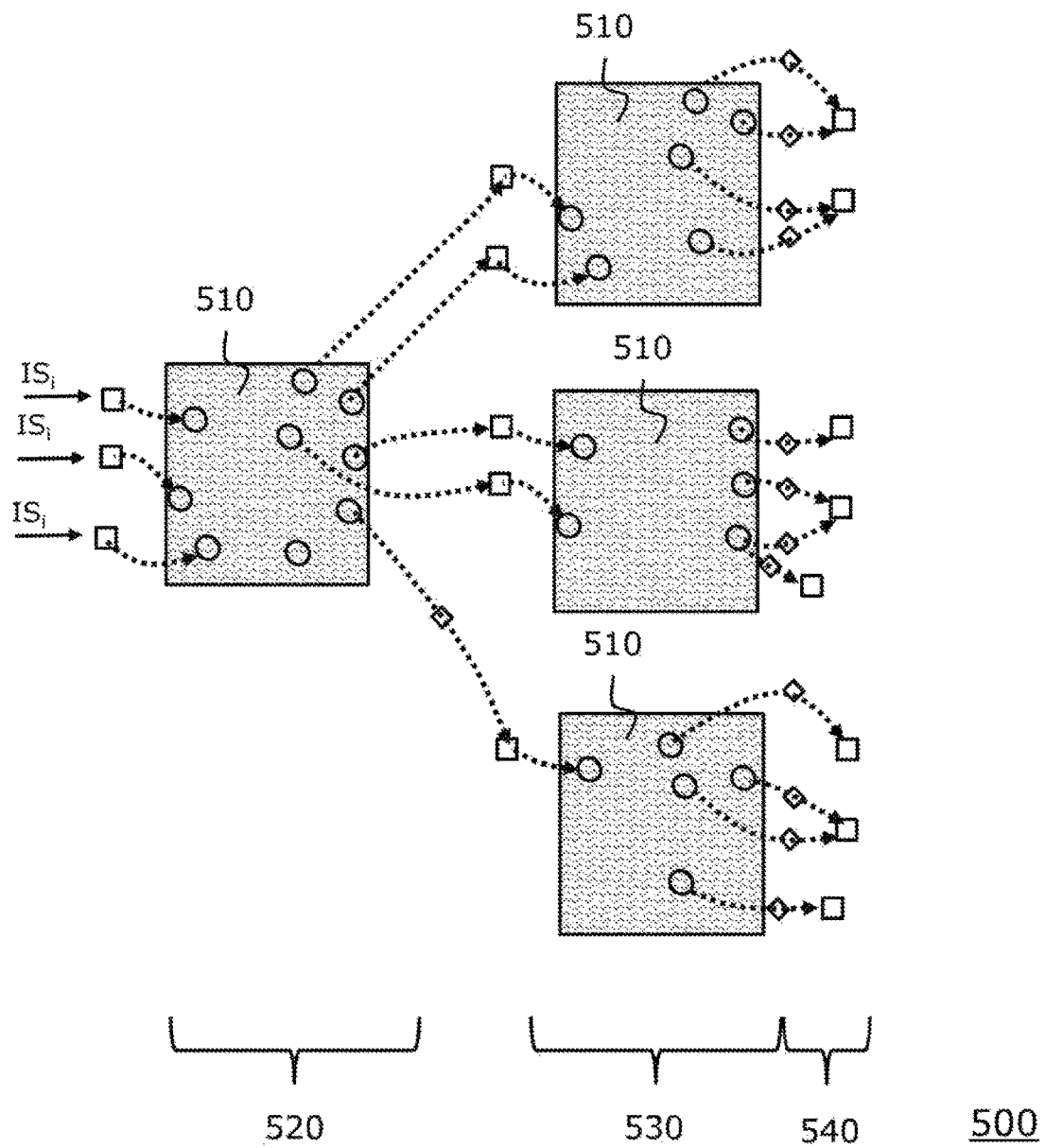
FIG. 5 shows a schematic top view of a photonic computing system comprising a plurality of interference regions.

FIG. 5 shows a schematic illustration (top view) of a photonic computing system 500 according to another embodiment of the invention. The computing system 500 comprises a plurality of interference regions 510. The plurality of interference regions 510 are arranged in a cascading manner having a first hierarchy layer 520, a second hierarchy layer 530 and an output layer 540. The output layer 540 may be trained for specific computation tasks.

Such cascaded layers can be arranged flexibly in many different configurations and may be adapted for complex computations tasks.

According to embodiments, different layers can be stacked vertically, arranged in the same plane, or any combination thereof. The readout circuitry might be sandwiched between multiple reservoir layers. The different reservoirs might have different intrinsic time scales.

According to embodiments, the systems 100, 200, 300, 400 and 500 may be configured to operate at multiple wavelengths. A wavelength filter may be arranged e.g. at the output layer 540 to separate the multiple wavelength for further processing.

FIG. 6 shows a side view of a photonic computing system 600 illustrating an embodiment for detecting the optical readout signal. According to this embodiment, a plurality of readout units 610 are placed in the optical interference region. Each of the readout units 610 comprise corrugations 611, which are placed at a border area of the middle layer 113 and the upper layer 112 of the waveguide structure 115. The corrugations 611 are configured to scatter an optical readout signal from the interference region to optical detectors 612 of the readout units 610. The corrugations 611 could be implemented e.g. by etching small defects into the waveguide structure 115 of the interference region 110. The optical detectors 612 are configured to detect the scattered optical readout signal and convert it into the electrical domain. According to other embodiments, the corrugations may be placed in the upper layer 112. The corrugation could also be another material with a different refractive index, e.g. a deposited and etched layer of silicon. According to other embodiments optical couplers, e.g. grating couplers that detect the signals and maintain the information in the optical domain in a second photonic layer could be used.

According to embodiments, the optical detectors 612 may be implemented as an array of pixels of a CCD or CMOS camera.

FIG. 7 shows a side view of a photonic computing system 700 illustrating another embodiment for detecting the optical readout signal. According to this embodiment, a plurality of readout units 710 are placed in the optical interference region 110. More particularly, the readout units 710 comprise optical detectors 711 which are embedded in the interference region 110. The optical detectors 711 are embodied as diodes comprising a pn junction. The readout units 710 further comprise electrical connections 712 that provide electrical connections to the optical detectors 711 and may be connected to electrical processing circuitry for further processing of the converted optical readout signals. The size of the detectors might be smaller than the wavelength of the optical signal. Therefore, sub-wavelength information of the interference pattern can be mapped into the electrical domain.

FIG. 8 shows a side view of a photonic computing system 800 illustrating yet another embodiment for detecting the optical readout signal. According to this embodiment, a readout unit 810 comprises electrical readout elements 811 which are configured to detect local changes of a capacitance or resistance of the interference region 110 caused by the readout signal of the optical power distribution. This embodiment is based on the fact that the respective optical mode of the planar waveguide structure 115 changes the capacitance and/or resistance of the waveguide structure 115. The electrical readout elements 811 are embodied as electrical connections that connect the Si layer 113 of the optical interference region 110 with a capacitance and/or resistance detection circuit 820.

Figure 9:
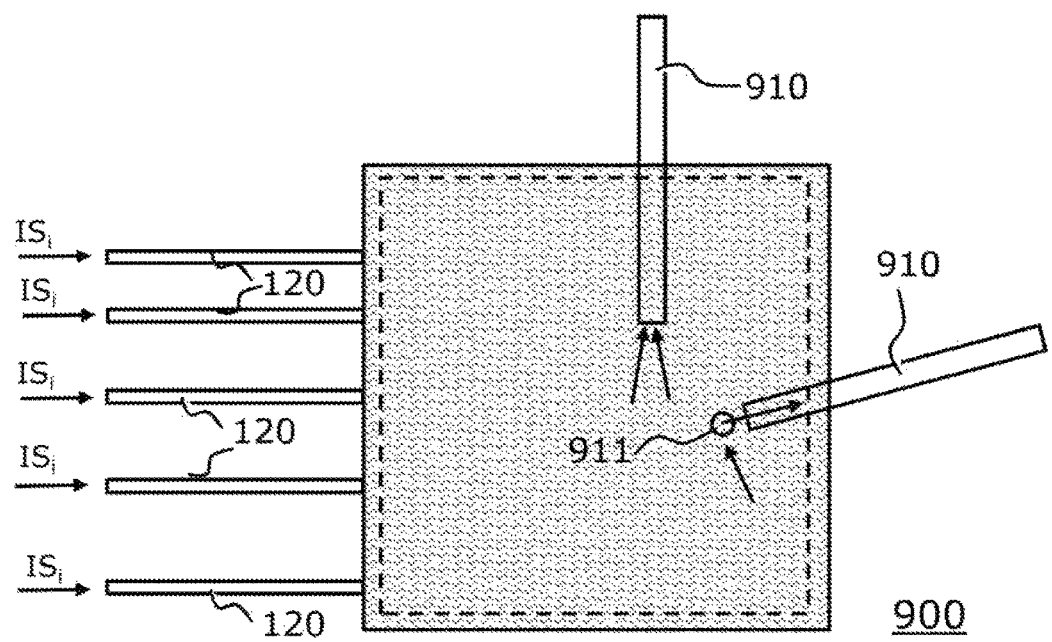
FIG. 9 shows a top view of a photonic computing system illustrating yet another embodiment for detecting the optical readout signal.

FIG. 9 shows a top view of a photonic computing system 900 illustrating yet another embodiment for detecting the optical readout signal. According to this embodiment, readout waveguides 910 are provided for reading out the optical readout signals. The readout waveguides 910 may be embedded in the middle layer, i.e. in the interference region, or the upper layer, i.e. above the interference region, or the lower layer, i.e. below the interference region. The waveguides 910 are made to have a small numerical aperture. Accordingly, only light from a specific angle (set of k-vectors) can enter the waveguides 910. In addition, the waveguides 910 may have a similar refractive index compared to the medium in the interference region. Accordingly, little reflection/scattering will occur for light "hitting" the waveguides 910 with other k-values, or at other positions of the waveguides. Furthermore, there might be a scattering center 911 right in front of the waveguides 910 to scatter light into the waveguides 910 at specific locations in the interference region.

FIG. 10 shows a flow chart of steps of a method 1000 for performing photonic computing according to an embodiment of the invention.

At a step 1010, the method starts.

At a step 1020, an optical input signal, in particular a modulated optical wave, is coupled to an optical interference region.

At a step 1030, the optical input signal creates an optical interference pattern in the optical interference region. The interference pattern has an optical power distribution.

At a step 1040, optical readout signals of the optical power distribution are detected at readout positions of an inner area of the optical interference region.

At a step 1050, the optical readout signals are weighted and combined to determine an output signal.

At a step 1060, the method ends.

It should be noted that during a learning phase the weights may be updated by a training procedure after each iteration or batch-wise.

According to a first aspect, the invention is embodied as a photonic computing system comprising an optical interference region and an input waveguide configured to couple an optical input signal to the optical interference region and to create an optical interference pattern in the optical interference region. The interference pattern has an optical power distribution. The photonic computing system further comprises a readout unit that is arranged in an inner area of the optical interference region. The readout unit is configured to detect an optical readout signal of the optical power distribution at a readout position of the inner area of the optical interference region.

Such a system provides the advantage that the interference region is a continuous interference region that is not limited to any discrete nodes, but rather allows that the readout unit and in particular a plurality of readout units can be placed at any arbitrary position within the inner area of the interference region. Such a system provides a lot of flexibility and freedom for positioning the readout nodes.

According to an embodiment, the system is configured as a reservoir computing system.

Such an embodied system operates as a reservoir computing system in the optical domain.

According to such an embodiment, the optical reservoir system comprises a plurality of optical reservoir nodes. The optical reservoir nodes correspond to the readout positions of the readout units and can hence be arranged very flexible at any position within the interference region. The intermediate space of the interference pattern and the interference region respectively establish optical reservoir connections between the plurality of optical reservoir nodes.

According to embodiments, systems that operate according to the reservoir computing paradigm have reservoir connections with weights that are set at the beginning of a learning operation and that do not change during the learning operation, while only output connections of the reservoir system are trained during the training operation.

Hence according to a further embodiment, the neuromorphic network comprises one or more input nodes, one or more output nodes and a plurality of output connections between the optical reservoir nodes and the one or more output nodes. One or more of the output connections comprise weighting elements that can be adjusted during a training process. According to a preferred embodiment the output nodes, the plurality of output connections and the weighting elements operate also in the optical domain. In other words, optical output connections, optical weighting elements and optical output nodes are provided.

According to an embodiment, the optical interference region is a confined interference region. The confinement may be implemented by means of confinement structures such as confinement walls that confine the interference region and have a refractive index that is different from the refractive index of the inner area of the interference region. Accordingly, the optical signals of the optical interference patterns are at least partially reflected by the confinement structure and facilitate the establishment of the interference region/signal.

According to embodiments, the computing system is configured to map temporal information of the optical input signal into the optical interference pattern. Accordingly, a current optical interference pattern does not only depend on the current optical input signals, but also on the previous optical input signals and the previous optical interference pattern respectively. In other words, the computing system provides a coupling between successive optical interference patterns. According to embodiments, the system is designed such that the influence of the previous optical input signals and the previous optical interference pattern respectively on the current optical interference pattern is fading over time. The time constant of the temporal mapping is according to embodiments adapted to the frequency of the input signals, which are encoded in the optical domain. According to embodiments, the time constant is chosen such that it is in the range of the period of the optical input signals.

According to embodiments, the computing system is configured to map the temporal information of the optical input signal into the optical interference pattern by an input delay waveguide. The input delay waveguide is configured to provide a delayed optical input signal to the interference region in addition to the not-delayed input signal.

According to embodiments, the input information could be encoded as digital stream of data or as an analogue stream that is e.g. received directly from a sensor such a as an optical spectrometer.

This is a reliable way to provide the temporal mapping. According to embodiments, the system may comprise a plurality of input delay waveguides to provide different temporal couplings between the optical interference patterns.

Alternatively, or concurrently, the computing system may be configured to map the temporal information of the optical input signal into the optical interference pattern by a feedback delay waveguide. The feedback delay waveguide is configured to receive an optical feedback signal from the interference region and to provide the received optical feedback signal with a time delay back to the interference region.

This is another reliable way to provide the temporal mapping. According to such an embodiment, a part of the optical interference pattern is coupled out to the feedback delay waveguide, is then delayed within the feedback delay waveguide and fed back with a time delay into the optical interference region. According to embodiments, the system may comprise a plurality of feedback delay waveguides with different time delays to provide different temporal couplings between the optical interference patterns.

According to a further embodiment, the system comprises thermo-optical elements, electro-optical elements, electrical feedback loops and/or optical cavities to map the temporal information of the optical input signal into the optical interference pattern.

According to further embodiments, the photonic computing system comprises one or more nonlinear components. The nonlinear components may be arranged in the interference region, in the input waveguides and/or in the feedback waveguides.

According to embodiments, the nonlinear components may be implemented as thermo-optical elements, electro-optical elements or optical cavities. The optical cavities may be arranged in the input delay waveguides or the feedback delay waveguides. The nonlinear components provide a nonlinear dependence of the optical interference pattern on the optical input signals.

More particularly, if according to embodiments information is encoded in the amplitude of the optical input signal, the amplitude at the input of the interference region should nonlinearly depend on the amplitude provided by the input waveguide or the phase at the input of the interference region should depend (linearly or nonlinearly) on the amplitude provided by the input waveguide. In the latter case, a linear phase shift corresponds to a nonlinear change of the power distribution in the interference region.

According to embodiments, the nonlinear optical elements may be an optical amplifier, a photorefractive element or an optical attenuator.

According to embodiments, the optical interference region may be formed by a planar waveguide structure. This may be e.g. a Si-waveguide structure comprising a Si-core and $SiO_2$ cladding layers. The planar waveguide structure may be a multimode or single mode structure.

According to embodiments, the readout unit may be configured to detect an optical intensity, an optical power, an optical energy, and/or the optical phase information of the optical interference pattern as optical readout signal. All of these characteristics may be used as readout signal.

According to embodiments, the readout unit is configured to detect the optical readout signal with a subwavelength resolution, i.e. a resolution having dimensions less than the wavelength of the optical input signal.

According to embodiments, the system comprises a corrugation in the optical interference region. The corrugation is configured to scatter the optical readout signal from the interference region to the readout unit. For small corrugations, information of the optical near-field in the optical interference region can be transformed into an optical far field, which is detected by the readout circuitry. Thus, the power distribution in the optical inference region can be read with a sub-wavelength resolution.

According to embodiments, the readout unit comprises an optical detector being embedded in the interference region. Such a readout unit may be embodied e.g. as a diode comprising a pn-j unction.

According to embodiments, the readout unit comprises an electrical readout element. The electrical readout element is configured to determine local changes of a capacitance or resistance of the interference region caused by a variation of the optical power distribution.

According to embodiments, the system comprises a plurality of scattering or absorption centers within the inner area of the interference region.

Such scattering or absorption centers may enhance the dynamic behavior of the system. In this respect, enhancing the dynamic behavior shall mean that small variations of the input signal result in stronger variations of the optical power distributions in the interference region.

According to embodiments, the scattering or absorption efficiency can be tuned.

The tuning may be done after fabrication, e.g. by electrical, thermal, or optical stimuli, and may be optimized for specific tasks.

According to embodiments, the system comprises a CCD or CMOS camera for detecting the optical power distribution.

According to embodiments, the system is configured to operate at multiple wavelengths. A wavelength filter may be arranged at an output of the system to separate the multiple wavelength for further processing.

According to embodiments, the system comprises one or more input nodes, one or more output nodes and one or more output connections between the optical reservoir nodes and the output nodes. One or more of the output connections comprise a weighting element which can be adjusted during a training process.

This facilitates the design of photonic computing systems that may provide advantages in particular in terms of speed, accuracy and power consumption. Furthermore, it may facilitate the design of compact sensor systems.

According to such an embodiment, only the output connections of the reservoir system are configured to be weighed and trained for a desired computation task. The training may use a software algorithm to perform the training, such as providing information about how to adjust the weights of the optical weighting elements. The resulting trained state of the reservoir system is encoded in the hardware, i.e. in the weighting elements, preferably in a non-volatile way.

According to embodiments, nodes and connections of the optical reservoir system and in particular the optical weighting elements may comprise materials whose optical properties can be modified permanently, but changeably, such that a change may be long term. This can be achieved through stimuli applied to the respective tunable element, in particular the optical weighting elements, during the training process. The stimuli may be optical, electrical, thermal, mechanical, magnetic, etc.

According to an embodiment, the system may comprise a plurality of optical interference regions. The plurality of optical interference regions may be arranged in a cascading manner.

According to another aspect of the invention, a method for performing photonic computing is provided. The method comprises a step of coupling an optical input signal to an optical interference region. The method comprises a further step of creating, by the optical input signal, an optical interference pattern in the optical interference region, the interference pattern having an optical power distribution. The method comprises a further step of detecting optical readout signals of the optical power distribution at readout positions of an inner area of the optical interference region. According to preferred embodiments, the detection is performed with sub-wavelength resolution.

According to embodiments, the method may comprise a further step of coupling as optical input signal a modulated optical wave to the interference region.

According to embodiments, the method may comprise a further step of weighting and combining the optical readout signals to determine an output signal. The weights for the optical readout signals are preferably set by a training procedure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology as used herein was chosen to best explain the principles of the embodiments, the practical application or technical improvement over technologies found in the marketplace, or to enable others of ordinary skill in the art to understand the embodiments disclosed herein.

What is claimed is:

1. A photonic computing system comprising:
   a continuous optical interference region, said continuous optical interference region being confined within edges and having an inner area within said edges, said edges being reflective of an optical input signal;
   an input waveguide configured to couple the optical input signal to the continuous optical interference region and to create an optical interference pattern in the continuous optical interference region, the interference pattern having an optical power distribution; and
   readout circuitry arranged in the inner area of the continuous optical interference region and configured to detect an optical readout signal of the optical power distribution at an arbitrarily located readout position of the inner area of the continuous optical interference region.

2. The photonic computing system as claimed in claim 1, wherein the system is configured as a reservoir computing system comprising as optical reservoir node the optical power of the optical power distribution within the continuous optical interference region at the readout position.

3. The photonic computing system as claimed in claim 2, the system further comprising:
   one or more input nodes;
   one or more output nodes; and
   one or more output connections between the optical reservoir nodes and the output nodes;
   wherein one or more of the output connections comprise a weighting element which can be adjusted during a training process.

4. The photonic computing system as claimed in claim 1, wherein the continuous optical interference region is a confined interference region.

5. The photonic computing system as claimed in claim 1, wherein the computing system is configured to map temporal information of the optical input signal into the optical interference pattern.

6. The photonic computing system as claimed in claim 5, wherein the computing system is configured to map the temporal information of the optical input signal into the optical interference pattern by an input delay waveguide, the input delay waveguide being configured to provide a delayed optical input signal to the continuous optical interference region.

7. The photonic computing system as claimed in claim 5, wherein the computing system is configured to map the temporal information of the optical input signal into the optical interference pattern by a feedback delay waveguide, the feedback delay waveguide being configured to receive an optical feedback signal from the continuous optical interference region and to provide the received optical feedback signal with a time delay back to the continuous optical interference region.

8. The photonic computing system as claimed in claim 1, the system further comprising a nonlinear component.

9. The photonic computing system as claimed in claim 8, wherein the nonlinear component is selected from the group consisting of a thermo-optical element, an electro-optical element, a photorefractive element, an optical amplifier, an attenuator, and an optical cavity.

10. The photonic computing system as claimed in claim 1, wherein the continuous optical interference region is formed by a planar waveguide structure.

11. The photonic computing system as claimed in claim 1, wherein the readout circuitry is configured to detect at least one of an optical intensity, an optical power, an optical energy, and an optical phase information of the optical interference pattern as optical readout signal.

12. The photonic computing system as claimed in claim 1, wherein the readout circuitry is configured to detect the optical readout signal with a subwavelength resolution.

13. The photonic computing system as claimed in claim 1, wherein the system further comprises a corrugation in the continuous optical interference region, the corrugation being configured to scatter the optical readout signal from the continuous optical interference region to the readout circuitry.

14. The photonic computing system as claimed in claim 1, wherein the readout circuitry comprises an optical detector being embedded in the continuous optical interference region.

15. The photonic computing system as claimed in claim 1, wherein the readout circuitry comprises an electrical readout element, the electrical readout element being configured to determine local changes of a capacitance or resistance of the continuous optical interference region caused by a variation of the optical power distribution.

16. The photonic computing system as claimed in claim 1, wherein the system further comprises a plurality of scattering or absorption centers within the inner area of the continuous optical interference region.

17. The photonic computing photonic computing system as claimed in claim 1, wherein the system comprises one of a CCD (charge-coupled device) camera and a CMOS (complementary metal-oxide-semiconductor) camera for detecting the optical power distribution.

18. The photonic computing system as claimed in claim 1, the system being configured to operate at multiple wavelengths.

19. The photonic computing system as claimed in claim 1, the system further comprising a plurality of continuous optical interference regions, the plurality of continuous optical interference region being arranged in a cascading manner.

20. A method for performing photonic computing, the method comprising:

coupling, via an input waveguide, an optical input signal to a continuous optical interference region, said continuous optical interference region being confined within edges and having an inner area within said edges, said edges being reflective of the optical input signal;

creating, by the optical input signal, an optical interference pattern in the continuous optical interference region, the interference pattern having an optical power distribution; and detecting, via readout circuitry, optical readout signals of the optical power distribution at arbitrarily located readout positions in the inner area of the continuous optical interference region.

\* \* \* \* \*